United States Patent [19]
Kofoed

[11] Patent Number: 5,690,209
[45] Date of Patent: Nov. 25, 1997

[54] CROSS-BELT SORTER

[75] Inventor: Ralph Kofoed, Hornslet, Denmark

[73] Assignee: Crisplant A/S, Denmark

[21] Appl. No.: 675,551

[22] Filed: Jul. 3, 1996

[51] Int. Cl.$^6$ .................................................. B65G 47/46
[52] U.S. Cl. ..................... 198/370.06; 198/370.03
[58] Field of Search ..................... 198/370.01, 370.03, 198/370.06

[56] References Cited

U.S. PATENT DOCUMENTS

| | | | |
|---|---|---|---|
| 4,096,936 | 6/1978 | Nielsen | 198/370.06 |
| 4,712,965 | 12/1987 | Lanziani | 198/370.06 X |
| 4,884,676 | 12/1989 | Suizu | 198/370.06 |
| 4,930,613 | 6/1990 | Okura et al. | 198/370.06 |

FOREIGN PATENT DOCUMENTS

| | | | |
|---|---|---|---|
| 6-40170 | 5/1986 | Japan . | |
| 8900974 | 11/1990 | Netherlands | 198/370.06 |

*Primary Examiner*—James R. Bidwell
*Attorney, Agent, or Firm*—Tim Headley; John Moetteli; Haynes and Boone, L.L.P.

[57] ABSTRACT

A conveyor comprises an endless loop of linked wheeled chassis members running in a guide track. The chassis members are T-shaped with the wheels of each member being attached to the ends of the cross-member of the T. A carrier is releasably attached to each of the chassis members and electrical power is generated by a hub-mounted generator attached to at least one of the wheels of each chassis member. The carriers are preferably in the form of cross-belt units driven by a.c. motors on the carriers whereby items placed on the units can be discharged transversely of the direction of movement of the conveyor.

8 Claims, 3 Drawing Sheets

CROSS-BELT SORTER

FIELD OF THE INVENTION

The present invention relates to a conveyor which is suitable for transporting objects from one locating to another. More particularly the invention relates to a conveyor for use in a selecting and sorting apparatus by receiving objects at one station and delivering the objects to any one of several succeeding stations.

DESCRIPTION OF THE PRIOR ART

Conveyors for use in a selecting and sorting apparatus are well known. U.S. Pat. No. 3,231,068, for example, discloses a conveyor which is equipped with transverse transporters by means of which objects carried by the conveyor can be discharged from the conveyor transversely to the direction of travel of the conveyor. The discharge of objects is achieved by operating an endless belt at the location of a discharge station, and different ways of mechanically driving the endless belt are disclosed.

It is also known to discharge objects by simply tilting the support carrying the object, and allowing the object to slide, under the effect of gravity, to a discharge station at the side of the conveyor.

Further, it has been proposed in GB-A-2,140,371 and in EP-A-0393773 to drive an endless belt on a carrier forming part of the conveyor using an electric motor. In the case of GB-A-2,140,371, the power for the electric motor is picked up from bus bars running along the side of the conveyor, but, due to difficulties with this arrangement, EP-A-0393773 proposes that each carrier should be provided with its own power generator driven by the relative movement between the carrier and a supporting frame of the conveyor when the conveyor is being driven.

GB-A-2,140,371 discloses the use of a permanent magnet d.c. motor and a conveyor in accordance with EP-A-0393773 has been built again using permanent magnet d.c. motors. While such motors appear at first sight to be suitable for such use, in view of the fact that their power output is proportional to applied voltage and one can readily control the applied voltage, in practice they are expensive and are not entirely free from the need for maintenance. Further, the overall construction of the conveyors in GB-A-2140371 and EP-A-0393773 do not lend themselves to quick repairs or provide a basis for different types of conveyors, i.e., conveyors which use discharge arrangements other than moving endless belts.

SUMMARY OF THE INVENTION

The present invention provides a conveyor comprising an endless loop formed by linked wheeled chassis members which have releasably attached to them carriers for discharging objects placed on the carriers in directions transverse to the direction of movement of the endless loop.

Preferably, at least one of the wheels of the chassis is provided with an electric generator for providing electrical power as the wheel rotates.

In a preferred embodiment, each carrier has an endless belt driven by an electric motor for discharging objects. The electric motor is in the form of an a.c. motor, and each carrier is provided with electrical circuitry for controlling the electric motor. Additionally, a battery is provided on each carrier.

DESCRIPTION OF THE DRAWINGS

In order that the present invention be more readily understood, an embodiment thereof will now be described by way of example with reference to the accompanying drawings, in which.

PREFERRED EMBODIMENT

The present invention provides a conveyor for transporting articles placed on discrete platforms to a selected one of a number of discharge stations located at one or both sides of the path of the conveyor.

Figure 1:
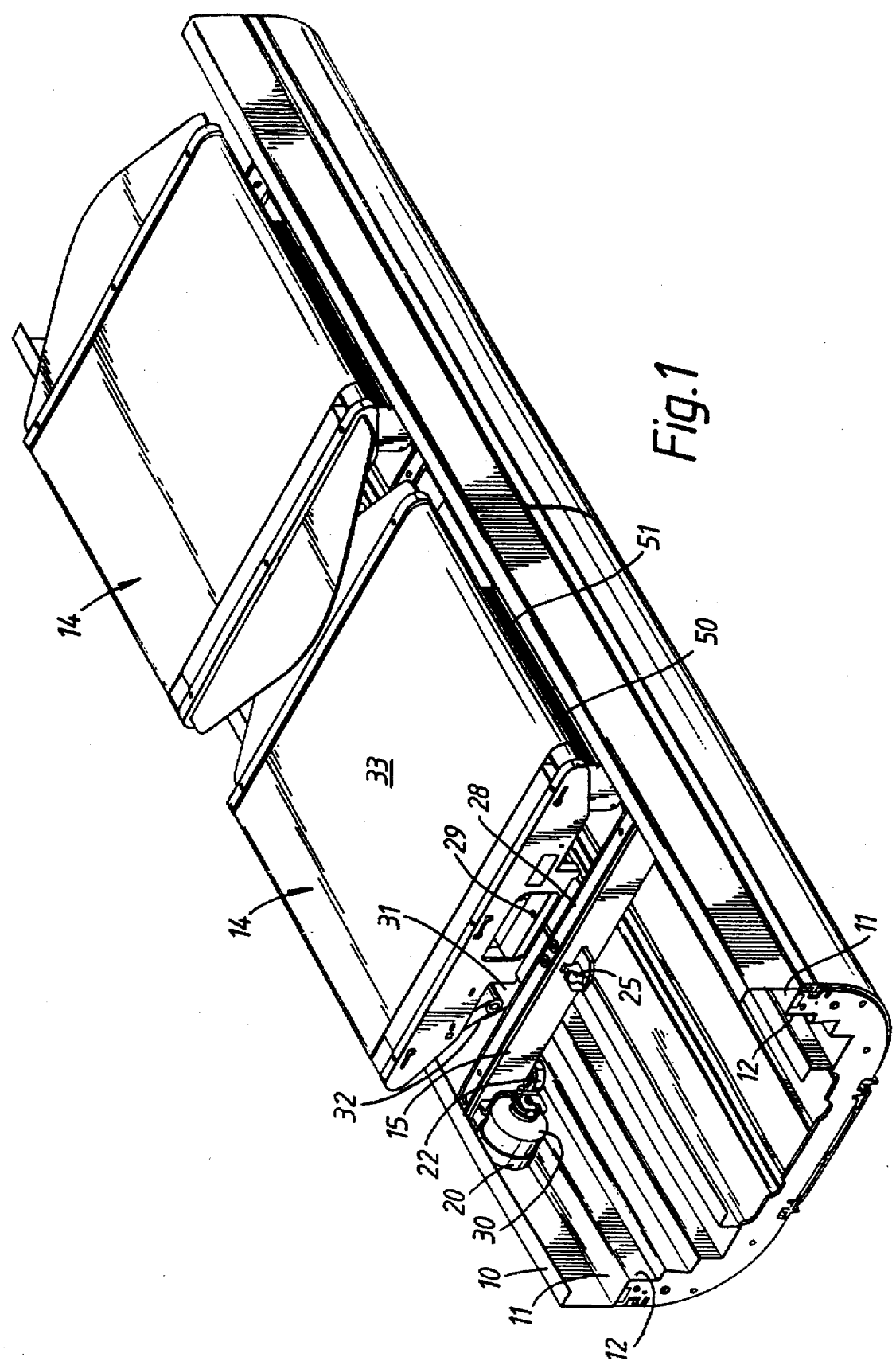
FIG. 1 shows a perspective view of a part of a conveyor according to the present invention.
Figure 2:
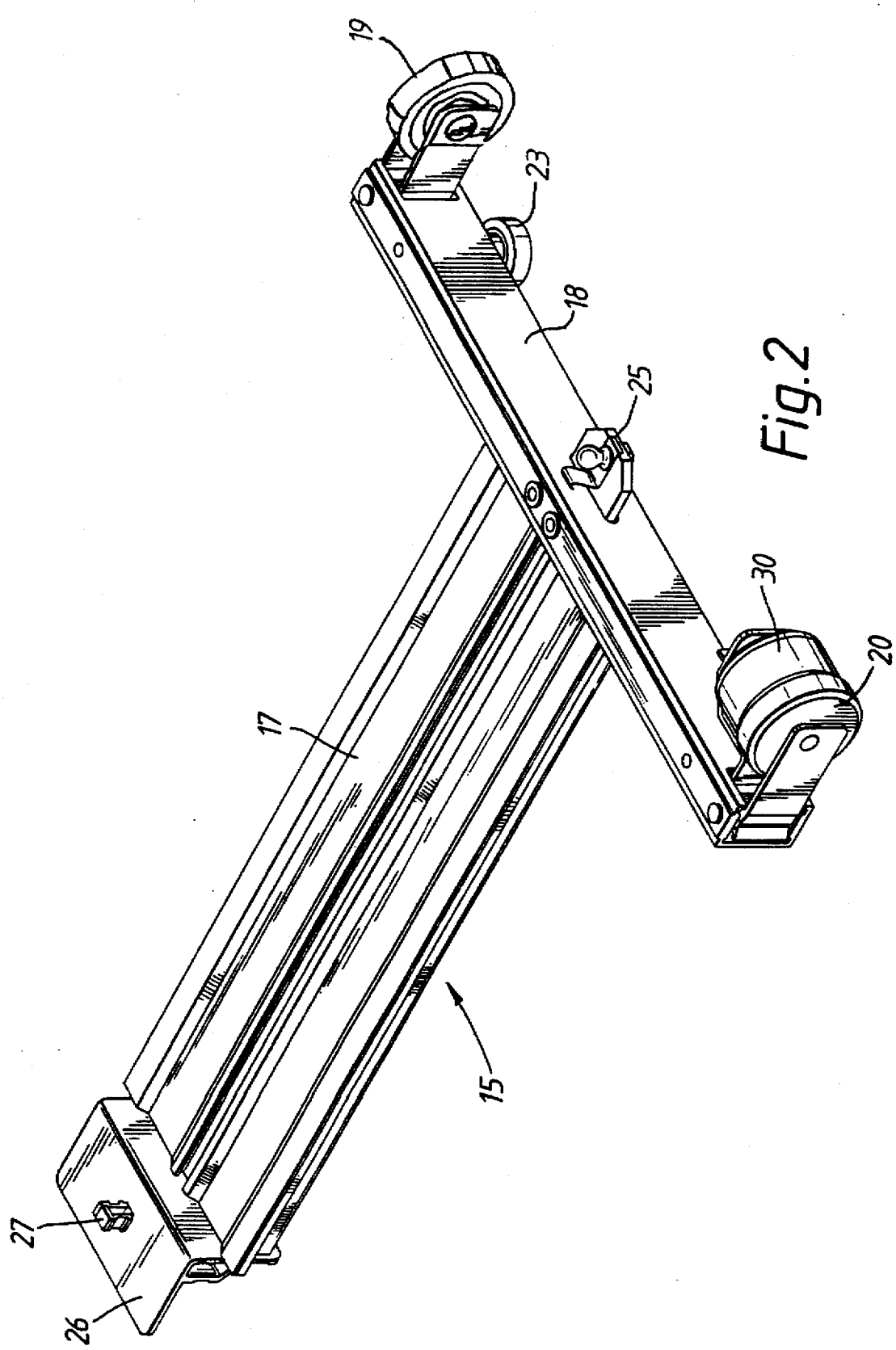
FIG. 2 shows a part of the conveyor shown in FIG. 1.

In the preferred embodiment shown in FIGS. 1 and 2, the discrete platforms are in the form of cross-belt units, although the platforms could take other forms such as tilt trays. The cross-belt form of the invention will now be described in detail.

As shown in FIG. 1, the conveyor comprises a shaped rail structure 10 which forms a track for the conveyor. The track forms a closed loop, and the conveyor will be provided with an induction station at one point on the loop, and a plurality of discharge stations at different points on the loop. The induction and discharge stations are conventional, and consequently are not described.

The rail structure 10 is shaped to provide horizontal and vertical guide surfaces 11 and 12, respectively, for cross-belt units 14, only two of which are shown. Each cross-belt unit 14 is mounted on a chassis member 15, which is more clearly shown in FIG. 2 and will be described in detail later. The units 14 are mounted in such a manner that they can be readily removed from the chassis member 15, should a problem arise, to be replaced with a new unit.

Each of the chassis members 15 are linked together in some convenient manner to form a continuous chain, and are driven in any convenient manner depending on the use to which the conveyor is to be put. Presently, we prefer to drive the continuous chain of chassis members 15 using a linear motor (not shown). The chassis members 15 are linked together in this embodiment by a ball and socket arrangement to provide a limited amount of movement in two dimensions to enable the conveyor to go around corners and up and down slopes. Referring now to FIG. 2, a chassis member 15 is shown in more detail and consists of a longitudinally extending member 17, one end of which is fixed to a cross-member 18 at the middle thereof. The ends of the cross-member 18 are provided with wheels 19, 20 which are the main running wheels and support the weight of the cross-belt unit 14. The cross-member 18 is also provided with two guide wheels 22 and 23, which are arranged to run along the vertical guide walls 12 of the track to provide stability in the lateral direction.

The middle of the cross-member 18 is provided with the ball portion 25 of the ball and socket joint. A socket portion of the joint is provided by an attachment 27 on a support angle 26 fixed to the other end of the longitudinal member 17 to receive the ball portion of the next chassis and be supported thereby. The cross-belt units 14 are fixed to the chassis members 15 by means of T-headed bolts (not shown), the head of which is received in a channel 28 formed along the member 17. The shanks of the bolts are received in holes 29 in the end frames of the units 14. The units 14 are removed by loosening the bolts and turning their heads through 90° to align the heads into the slot in the channel 28, and then simply lifting the unit 14 off the chassis member 15.

The above-described construction allows a basic conveyor structure to be installed with any suitable discrete platforms fixed to the linked chassis members 15. If the discrete platforms are cross-belt units 14 driven by electric motors 31 as shown, or if one wishes to install electronics on each platform, then it is necessary to provide electrical power, and this is achieved in the present invention by fitting an electrical generator 30 to one or both of the main running wheels 19, 20. FIG. 2 shows the case where only the wheel 20 is provided with the electrical generator 30.

The generator 30 is constructed such that the outer cylindrical case is fixed to and rotates with the wheel while the central spindle is in fact fixed. This requires the generator to be inside out as compared with a conventional generator. Further due to the small diameter available for the generator, it has been necessary to utilize new, high performance, permanent magnets in the construction of the generator. This construction does not require the provision of any gearing of the generator, and thus fewer components and less wear and tear.

Figure 3:
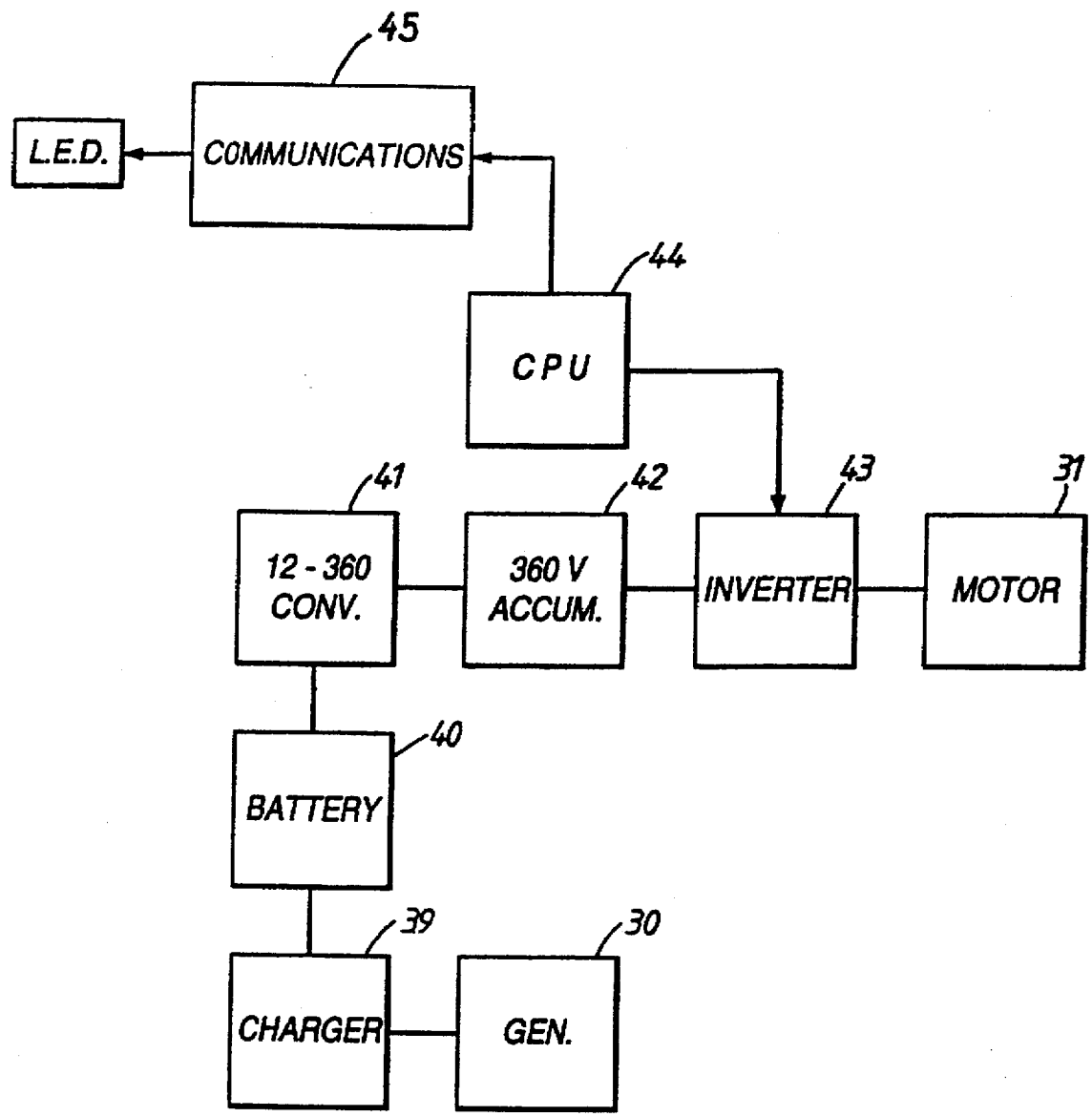
FIG. 3 shows a block diagram of circuitry for use with the conveyor shown in FIG. 1.

As mentioned above, each cross-belt unit 14 includes an electric motor 31 for driving an endless belt 33 via a belt 32 and drive roller. An idler roller is also provided with the belt 33 entrained around the rollers. The preferred form of electric motor is an a.c. induction motor operating at, e.g., 220 V. Such a motor is a standard unit in so far as suitable motors are commercially available from a number of sources. However, they require more sophisticated control than d.c. motors and this will now be described with reference to FIG. 3.

The generator 30 is used to charge a battery 40 via a charging circuit 39 of conventional design. The battery is of any suitable size, but it is preferred that it is a readily available 12 V rechargeable battery. This in turn feeds a voltage step-up circuit in the form of a 12 V–360 V converter 41, which then feeds a 360 V accumulator 42 in the form of a bank of capacitors.

A switched frequency inverter circuit 43 controlled by a CPU 44 is used to supply the motor 31 from the accumulator 42. The requirements of the motor 31 are monitored by the circuit 43 and the CPU 44 by monitoring the slip angle between the rotor and the magnetic field set up by the stator, and comparing it with a desired value. This allows the system to control the cross-belt unit 14, and permit one and the same unit 14 to handle both very light and very heavy objects.

In practice, the battery is housed in a unit 50 attached to the underside of the cross-belt unit 14 while all the electronics is housed in another unit 51, which sits side-by-side with the unit 50. It will be seen that with this arrangement, in order to deal with a faulty cross-belt unit, all one has to do is electrically disconnect the generator 30 from the electronics unit 51, uncouple the unit 14 from the chassis member 15, and lift off the whole unit with its motor, battery, and electronics. This has great advantages when one is considering down time of the conveyor which has to be kept to a minimum. It also allows different platforms to be fitted to the chassis 15.

The CPU 44 is shown to have a communications circuit 45 connected to it so that it can provide information to a central control and/or receive information from the central control. This is achieved using a remote, non-contact link such as an LED based system.

The CPU 44 can be used to monitor the performance of the various parts of the system, including the generator 30 and the motor 31, and communicate any faults or potential faults to the central control.

Various modifications can be made. For example, it is envisaged that the generator 30 on the wheel 20 of one chassis 15 will be used to provide power, not to its own cross-belt unit but to that adjacent to it. This, however, could be changed. Also, the CPU 44 could be used to monitor whether or not an object was present on its platform.

It is also possible to have alternate chassis members 15 provided with two generators, i.e., one of each wheel 19, 20 in order to supply power to its own platform and the adjacent one.

What I claim is:

1. A conveyor comprising a plurality of wheeled chassis members linked together to form an endless loop, which chassis members have releasably attached to them carriers for discharging objects placed on the carriers in directions transverse to the direction of movement of the endless loop, wherein at least one of the wheels of each of a plurality of said linked wheeled chassis members is provided with an electric generator for providing electrical power as the wheel rotates in use, and wherein the chassis members are in the form of T-shaped members with wheels on the extremities of the cross-member of the T and the end of the T of one chassis member being connected to the cross-member of the adjacent chassis member.

2. A conveyor according to claim 1, wherein each electric generator compromises a cylindrical casing which is fixed to and rotates with the wheel with respect to a central spindle.

3. A conveyor according to claim 2, wherein the cylindrical casing has a diameter no larger than the diameter of the wheel to which it is attached.

4. A conveyor according to claim 2, wherein each generator is an alternator, and a rectifying and charging circuit is provided for charging a battery from the alternator.

5. A conveyor according to claim 1, wherein the connection between T-shaped members permits relative movement in both the horizontal and vertical planes.

6. A conveyor according to claim 1, wherein the carriers comprise endless belts arranged to be driven in a direction transverse to the direction of movement of the endless loop.

7. A conveyor according to claim 6, wherein the endless belts are arranged to be driven by electric motors provided on the carriers.

8. A conveyor according to claim 7, wherein the electric motors are a.c. motors driven via control apparatus provided in the carriers.

* * * * *

UNITED STATES PATENT AND TRADEMARK OFFICE
CERTIFICATE OF CORRECTION

PATENT NO. : 5,690,209
DATED : November 25, 1997
INVENTOR(s) : Ralph Kofoed

It is certified that errors appear in the above-identified patent and that said Letters Patent is hereby corrected as shown below:

Column 2, line 28, "dearly" should read --clearly--.
Column 3, line 35 , "12 V-360 V" should read --12 V -- 360 V--.

Signed and Sealed this

Fifth Day of May, 1998

*Attest:*

BRUCE LEHMAN

*Attesting Officer*  *Commissioner of Patents and Trademarks*